United States Patent
Fung et al.

[11] Patent Number: 5,866,495
[45] Date of Patent: Feb. 2, 1999

[54] METHOD OF REGENERATING DEACTIVATED CATALYSTS

[75] Inventors: Shun C. Fung, Bridgewater, N.J.;
Samuel J. Tauster, Englishtown, N.J.;
Jay Y. Koo, Bridgewater, N.J.

[73] Assignee: Exxon Research & Engineering Company, Florham Park, N.J.

[21] Appl. No.: 465,776

[22] Filed: Jun. 6, 1995

Related U.S. Application Data

[63] Continuation of Ser. No. 104,255, Aug. 10, 1993, which is a continuation of Ser. No. 709,154, Jun. 3, 1991, abandoned, which is a continuation of Ser. No. 432,221, Nov. 6, 1989, abandoned, which is a continuation of Ser. No. 205,567, Jun. 15, 1988, Pat. No. 4,925,819, which is a continuation of Ser. No. 814,027, Dec. 23, 1995, abandoned, which is a continuation of Ser. No. 550,951, Nov. 10, 1983, abandoned.

[51] Int. Cl.$^6$ .............................. B01J 38/42; B01J 38/44
[52] U.S. Cl. ................................................ 502/37; 502/35
[58] Field of Search ........................................ 502/35, 37

[56] References Cited

U.S. PATENT DOCUMENTS

| | | | |
|---|---|---|---|
| 3,773,686 | 11/1973 | Hayes | 502/35 |
| 3,937,660 | 2/1976 | Yates et al. | 208/140 |
| 3,943,052 | 3/1976 | Kmak et al. | 502/35 |
| 4,192,771 | 3/1980 | Burbidge et al. | 252/415 |
| 4,218,338 | 8/1980 | Huin et al. | 252/415 |
| 4,444,897 | 4/1984 | Fung et al. | 502/37 |

*Primary Examiner*—Glenn A. Caldarola
*Assistant Examiner*—Alexander G. Ghyka
*Attorney, Agent, or Firm*—Edward F. Sherer

[57] ABSTRACT

A deactivated reforming catalyst comprising a type L zeolite containing a Group VIII noble metal may be regenerated and have enhanced dispersion by a method involving contacting the catalyst with oxygen and water at elevated temperatures, contacting the catalyst at elevated temperatures with a source of chlorine such as HCl or $Cl_2$, and preferably oxygen and water, contacting the catalyst at elevated temperatures with oxygen and optionally water, and contacting the catalyst at elevated temperatures with hydrogen and optionally water to reduce the catalyst. Preferably the noble metal is platinum.

21 Claims, 7 Drawing Sheets

510°C, 100 PSIG, H2/HC = 6, SV = 50 W/W/HR; (1) BEN ÷ (BEN + $C_{2-5}$)
● = DATA AT 2–4 HRS; ▲ = DATA AT >20 HRS

METHOD OF REGENERATING DEACTIVATED CATALYSTS

This application is a continuation of application Ser. No. 08/104,255, filed Aug. 10, 1993, which is a continuation of application Ser. No. 07/709,154, filed Jun. 3, 1991, now abandoned, which is a continuation of application Ser. No. 07/432,221, filed Nov. 6, 1989, now abandoned, which is a continuation of application Ser. No. 07/205,567, filed Jun. 15, 1988, now U.S. Pat. No. 4,925,819, which is a continuation of application Ser. No. 07/814,027, filed Dec. 23, 1985, now abandoned, which is a continuation of application Ser. No. 07/550,951, filed Nov. 10, 1983, now abandoned.

BACKGROUND OF THE INVENTION

Field of the Invention

This invention relates to a method of regenerating and enhancing the dispersion of moderately or severely deactivated reforming catalysts consisting of one or more Group VIII noble metals supported on zeolites, preferably a catalyst consisting of platinum on potassium-exchanged zeolite L. The regenerated catalyst herein exhibits improved activity and activity maintenance for light naphtha aromatization over the non-treated material.

Discussion of Relevant References

Several materials have been employed as hydrocarbon conversion catalysts in such processes as reforming, catalytic dewaxing, alkylation, oxidation and hydrocracking. Examples of catalysts useful for this purpose include those materials comprising a catalytically active metal such as a Group VIII noble metal and optionally rhenium supported on or impregnated into a carrier.

Among the hydrocarbon conversion processes, catalytic reforming in the presence of hydrogen is one of the most important. Catalytic reforming is a refinery process designed to increase the octane number of naphtha. Typically in this process, the naphtha is passed over a suitable catalyst under reforming conditions, for example elevated temperatures and pressures well known in the industry in the presence of hydrogen gas and a $H_2$/hydrocarbon mole ratio of about 2 to 20. This process involves several different types of reactions, including isomerization, dehydrocyclization of paraffins to produce naphthenes and aromatics, dehydrogenation of cyclohexanes and other naphthenes and alkanes, isomerization/dehydrogenation of cyclopentanes, isomerization of normal paraffins to isoparaffins, and hydrocracking. Paraffin isomerization occurs relatively easily, but contributes only a limited improvement in octane number. The reforming reactions most important for the production of high octane components are those which produce aromatics.

The ideal reaction scheme minimizes the hydrocracking of long chain paraffins to gaseous hydrocarbons such as methane and ethane to improve the yield and selectivity to more valuable products of the other reforming reactions, particularly dehydrocyclization. Examples of known catalysts useful for reforming include platinum and optionally rhenium or iridium on an alumina support, platinum on type X and Y zeolites, provided the reactants and products are sufficiently small to flow through the pores of the zeolites, and platinum on cation exchanged type L zeolites.

While zeolite L catalysts, usually in their hydrogen form, have been employed as catalytic dewaxing catalysts and in other applications, they are particularly useful in reforming because they decrease the amount of hydrocracking which occurs during reforming. For example, U.S. Pat. No. 4,104,320 discloses that the use of zeolite L as a support increases the selectivity of the reaction for producing aromatic products. This improvement, however, has been made at the expense of catalyst life. U.K. Appln. 82-14147 filed May 14, 1982 to Wortel entitled "Improved Zeolite L" teaches that a highly crystalline zeolite L material having a cylindrical morphology leads to an improved catalyst life for dehydrocyclization reactions over a conventionally prepared zeolite L disclosed in U.S. Pat. No. 3,216,789. Finally, Belg. Pat. Nos. 895,778 and 895,779 disclose use of a barium-exchanged zeolite L catalyst for high yields in reforming, dehydrocyclization, dealkylation and dehydroisomerization.

Because reforming catalysts tend to deactivate on prolonged use thereof due to the buildup of coke deposits, regeneration becomes necessary to prolong the life of the catalyst. In addition, platinum supported on zeolite L experiences an agglomeration of the platinum particles so as adversely to affect catalyst activity. Thus, for the latter catalyst effective regeneration requires not only the removal of carbonaceous residue from the surface of the catalyst, but also the redispersion of the platinum component of the catalyst.

It is well known that coke deposits may be removed from such catalysts by heating them in the presence of dilute oxygen at a flame-front temperature of 430° to 540° C. This combustion may be preceeded by a flushing with hydrogen or nitrogen gas. High temperature decoking leads, however, to loss of surface area of the supported metal particles and to removal of platinum from the zeolite channels, thus resulting in loss of catalyst activity. Thus, after combustion, the catalyst is often subjected to oxychlorination by contact with air and chlorine or a chlorinated compound such as $CCl_4$ at elevated temperatures. French Patent Publication 2,360,540 filed Sep. 9, 1981 to Bernard et al. further teaches that catalyst regeneration is improved by subjecting the catalyst after oxychlorination to a treatment with water and cooling air before the catalyst is reduced. In addition, French. Appl. No. 8,000,114 to Bernard discloses a hydrogen regeneration technique.

Not all of the known regeneration techniques, however, effectively regenerate the catalyst, particularly if the catalyst is severely deactivated. Redispersion of agglomerated platinum particles in such a catalyst, where the particles are of comparable size to the main zeolite channel, is difficult due to inhibited transport of the reactive gases used in the redispersion.

SUMMARY OF THE INVENTION

In accordance with the present invention it has now been found that deactivated reforming catalysts may be effectively regenerated to enhance their catalytic activity and activity maintenance properties by a process whereby coke deposits are removed from the catalyst, the dispersion of the metal is enhanced by an oxychlorination procedure. The procedure leads temporarily to excess chlorine on the catalyst surface. The excess chlorine is then removed from the catalyst and the noble metal is stabilized on the catalyst surface. More preferably the method herein for regenerating deactivated reforming catalysts which comprise a type L zeolite containing at least one Group VIII noble metal comprises the steps of:

(a) heating the catalyst at a temperature of from about 380° to 540° C. in the presence of a gaseous stream comprising oxygen, hydrogen or an inert gas and from 0 to 10% by volume water for up to 10 hours;

(b) This step can proceed in one of four manners:
  (i) The catalyst is oxychlorinated (dispersion of the noble metal) by heating the catalyst at a temperature of from about 400° to 530° C. for up to 10 hours in the presence of a gaseous stream comprising from 0 to 10% by volume water and a source of chlorine in the presence of oxygen.
  (ii) The catalyst is chlorinated by heating the catalyst at a temperature from about 400° to 530° C. for up to 10 hours in the presence of a gaseous stream comprising from 0 to 10% by volume water and a source of chlorine in the presence of hydrogen, but when HCl is the source of chlorine, hydrogen is not required. Oxychlorination will then occur in the subsequent step (c).
  (iii) Combining steps (ii) and (i) in 2 that order. The preferred chlorine sources in these steps are HCl and $Cl_2$.
  (iv) The catalyst is chlorinated by heating at a temperature from about 400° to 530° C. for up to 10 hours in the presence of a gaseous stream comprising from 0 to 10% by volume of water and an effective amount of chlorine.

In addition, if the catalyst is deactivated and hydrogen or an inert gas is employed in the first step, oxygen must be present in the gaseous stream of the second step, i.e., this second step must be an oxychlorination step to ensure coke removal.

(c) heating the catalyst at a temperature of from about 400° to 540° C. for up to 7 hours in the presence of a gaseous stream comprising oxygen and essentially no water, or for up to 5 hours in the presence of a gaseous stream comprising oxygen and from greater than 0 to 10% by volume water; and (d) heating the catalyst at a temperature of from about 400° to 530° C. for up to 10 hours in the presence of a gaseous stream comprising from 0 to 10% by volume water and a source of hydrogen.

The preferred catalysts prepared by the process herein consist of a type L zeolite having exchangeable cations of which at least 75 percent are selected from Li, Na, K, Rb, Cs, Ca and Ba catlions which contain at least one Group VIII noble metal and are characterized in that the particles of the noble metal, prior to reduction thereof, are well dispersed over the surface of the catalyst and at least about 90% of the noble metal, prior to reduction, is dispersed in the form of particles having a diameter of less than about 7 Å. More preferably the catalyst will be such that more than 98% of the noble metal, prior to or after reduction, is dispersed in the form of particles having a diameter less than about 7 Å and less than 2% is dispersed in the form of particles with a diameter of 7 Å or greater.

The method herein results in catalysts which have effective catalyst activity and activity maintenance for a sustained period of reforming. This method is particularly advantageous for regenerating severely deactivated catalysts because it improves redispersibility by opening up the zeolite channels which are clogged by agglomerates of the noble metal.

DESCRIPTION OF THE PREFERRED EMBODIMENTS

Figure 1:
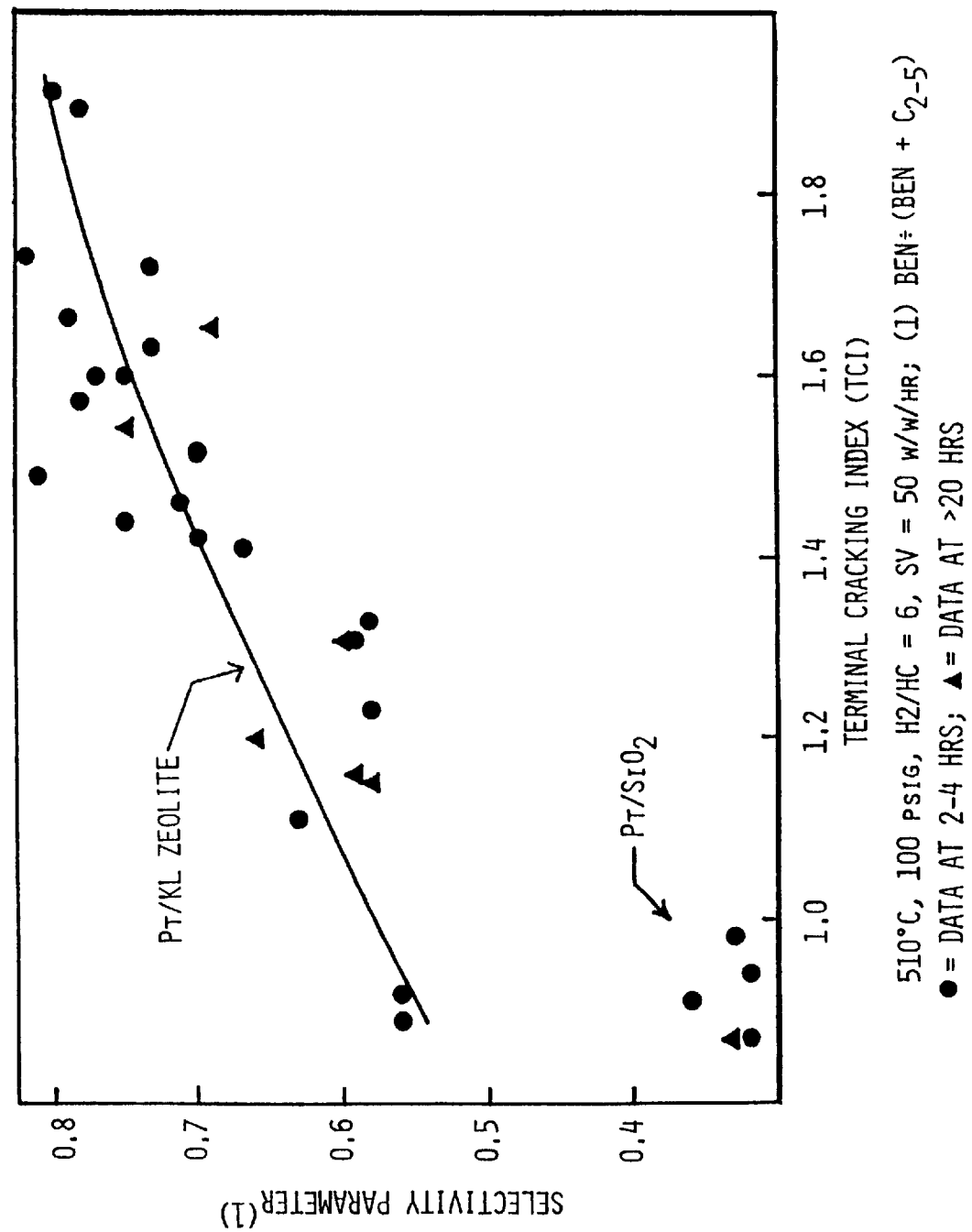
FIG. 1 represents a plot of the selectivity for benzene as measured by the selectivity parameter (weight ratio of benzene product to the sum of benzene plus $C_2$ to $C_5$ products) achieved, as a function of the terminal cracking index (TCI) defined hereinbelow, for platinum on type L zeolites and for platinum on silica after a time on oil of either about 3 or about 22 hours.

The type L zeolites are defined herein as synthetic zeolites which crystallize in the hexagonal system with a characteristic x-ray diffraction pattern obtained from $CuK_\alpha$ radiation with the major d(Å) peak values set out in Table A:

TABLE A 16.1±0.3
7.52±0.04
6.00±0.04
4.57±0.04
4.35±0.04
3.91±0.02
3.47±0.02
3.28±0.02
3.17±0.01
3.07±0.01
2.91±0.01
2.65±0.01
2.46±0.01
2.42±0.01
2.19±0.01

Thus, they share a common zeolitic structure. For purposes of this invention type L zeolites have a general formula as follows:

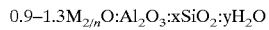

where M designates at least one exchangeable cation, n represents the valence of M, y is any value from 0 to about 9, and x is disclosed in U.S. Pat. No. 3,216,789 to be 5.2 to 6.9, but may be outside this range provided the x-ray diffraction pattern of the zeolite is the same as zeolite L. A more complete description of zeolite L is provided in U.S. Pat. No. 3,216,789. Zeolite L has channel-shaped pores undulating from about 7 to 13 Å in diameter and may occur in the form of cylindrical crystals with a mean diameter of at least 0.5 micron and an aspect ratio of at least 0.5 (as described, e.g., in U.K. Appln. 82-14747, the entire disclosure of which is incorporated herein by reference), as well as in other sizes and shapes.

The type L zeolites are conventionally prepared such that M in the above formula is potassium. See, e.g., U.S. Pat. Nos. 3,216,789 and 3,867,512. The potassium can be ion exchanged, as is well known, by treating the zeolite in an aqueous solution containing other cations. It is difficult, however, to exchange more than 75% of the original potassium cations, because some cations occupy sites in the zeolite structure which are nearly inaccessible. At least 75% of the exchangeable cations are selected from lithium, sodium, potassium, rubidium, cesium, calcium and barium. More preferably, the cation is sodium, potassium, rubidium or cesium, more preferably still, potassium, rubidium or cesium, and most preferably potassium. Optionally, the exchangeable cations may consist of mixtures of the above-named Group IA cations or mixtures of a Group IA cation and barium or calcium cations. These mixtures of cations may be achieved, for example, by treating the zeolite L with an aqueous solution containing, e.g., a rubidium and/or cesium salt and then washing to remove excess ions. This ion exchange treatment can be repeated to effect further ion exchange, although to a lesser degree.

The Group VIII noble metals which are necessary for catalytic activity are those metals from Group VIII of the Periodic Table of Elements which are selected from osmium, ruthenium, rhodium, iridium, palladium and platinum. Preferably, the metals which are employed herein are platinum, rhodium or iridium, and most preferably platinum. The metals may be be present in any combination desired. Rhenium, a Group VIIB metal, may also be present so long as at least one Group VIII noble metal is present.

The amount of Group VIII noble metal present in the catalyst will be an effective amount and will depend, for example, on required catalyst activity, ease of uniform dispersion, and the crystal size of the type L zeolite. Crystal size limits the effective catalyst loading since highly loaded crystals of zeolite which have a large dimension parallel to the channels could easily lead to pore plugging during operation as the noble metal agglomerates inside the channels. Generally, however, the level of metal present will range from about 0.1 to 6%, preferably 0.1 to 3.5% and more preferably 0.1 to 2.5% by weight of the catalyst. Furthermore, the amount of metal present is generally from about 0.1 to 2.0% by weight of the catalyst if the average zeolite crystallite size parallel to the channels is greater than about 0.2 micron, and from about 1.0 to 6% by weight if the average zeolite crystallite size parallel to the channels is no greater than about 0.2 micron.

The Group VIII noble metals may be introduced into the zeolite by, for example, ion exchange, impregnation, carbonyl decomposition, adsorption from the gaseous phase, introduction during zeolite synthesis, and adsorption of metal vapor. The preferred technique is ion exchange. In some cases, e.g., when the metal(s) have been introduced by an ion-exchange process, it is preferred to remove the residual acidity of the zeolite by treating the catalyst, which has previously been reduced by hydrogen, with an aqueous solution of an alkaline base such as potassium carbonate. This treatment will neutralize any hydrogen ions formed during the reduction of Group VIII noble metal ions by hydrogen and will adjust the pH to within the range specified hereinbelow.

The preferred regenerated and dispersed reforming catalyst produced by the process is a unique composition characterized by several properties which lead to improved selectivity and activity maintenance over what is exhibited by other reforming catalysts outside the class defined herein under the same catalytic conditions. The greater the degree of dispersion of the metal within the channels, i.e., onto the internal surface area of the zeolite, the better will be the activity maintenance of the catalyst.

The activity of a catalyst is a measure of its ability to convert feed to products. While a catalyst may have a high activity, the products formed may not be necessarily the desired products. The term "selectivity" is a measure of the ability of the catalyst to convert feed to desired products. Activity maintenance concerns the ability of the catalyst to maintain a portion of its activity over time at conversion conditions, other variables remaining constant.

The decline in catalyst activity at conversion conditions is believed to be due primarily to, crystal growth or agglomeration of the noble metal particles and secondarily to the formation of coke on the external and internal surfaces of the catalyst. At the same noble metal loading, catalysts containing particles or crystals of noble metals of a size greater than that disclosed above are less active and less selective than catalysts containing the smaller particles. Coke formation, probably due to complex condensation and dehydrogenation reactions, results in the shielding of the noble metal from the reaction mixture, thereby limiting the catalytic sites available for promoting reactions.

As catalytic activity declines by virtue of agglomeration and coke formation the yield of desirable products will decline, and depending upon the economics of the operation a process employing the catalyst will have to be interrupted and catalyst activity restored to its initial value. Generally, catalytic activity can be maintained by increasing temperature, but there are limits beyond which the temperature cannot be increased, for example, temperatures which will change the nature of the zeolite or lead to undesirable side reactions.

Catalyst activity will decline over time as severity increases. Factors which affect severity include: the hydrogen to oil mole ratio, hydrogen partial pressure, total pressure, temperature, feed rate per volume of catalyst (space velocity), and type of hydrocarbon in the feed.

In the measurement of activity maintenance all variables are fixed and only the catalyst differs. Thus, an activity of one catalyst over a period of time can be directly compared to the activity of another catalyst over the same time period where feed, hydrogen to oil ratios, pressures, etc. are constant.

Catalysts may be evaluated for their activity maintenance by two tests. In the Standard Activity Test (SAT) which is conventionally employed, the catalyst is sieved, mixed with sieved silica and charged into a reactor. The catalyst is then subjected to conditions of 510° C., 700 kPa (gauge), a space velocity of 2.5 w/w/hour and a $H_2$/hydrocarbon mole ratio of 6. The feed consists by weight of 60% n-hexane, 30% methylpentane and 10% methylcyclopentane (MCP). Catalysts are evaluated with respect to their cycle lengths, defined as the number of hours in which a time-averaged benzene yield of 50% by weight is maintained.

A second test of activity maintenance known as the Expedited Catalyst Aging Test (ECAT) has been developed where a total of 0.20 g of catalyst consisting of 20/40 mesh particles is mixed with 0.80 g of $SiO_2$ of 20/40 mesh. The resulting catalyst charge is introduced into a stainless steel downflow reactor of about 1 cm inner diameter equipped with a thermocouple. Before introduction of feed the catalyst is reduced in situ under flowing $H_2$ gas at temperatures no greater than 525° C. After reduction the feed is introduced into the reactor along with $H_2$ gas at a mole ratio of H$_2$:hydrocarbon of 6 and a space velocity of 50 w/w/hour, at a temperature of 510° C. and a pressure of 700 kPa (gauge). The products were analyzed using on-line gas chromatography, although other techniques are available and known in the industry. Catalysts are evaluated with respect to their benzene yield (weight percent) after 24 hours on feed.

The improvement in activity maintenance is manifested by the preferred catalysts of this invention in that they all provide a benzene yield in excess of 7 weight percent after 24 hours on oil in the ECAT test as described above using a feed comprising 20% by volume methylcyclopentane and 80% by volume n-hexane.

These preferred catalysts of enhanced dispersion, at least prior to reduction thereof, consist of noble metal particles well dispersed over the surface of the catalyst. By the expression "well dispersed over the catalyst surface" is meant that the diameter of substantially all the particles in which the noble metal is dispersed is less than 7 Å, as described hereinbelow. By "substantially all" is meant that at least 90%, preferably 98%, of the noble metal is dispersed in the form of smaller than 7 Å particles. Initial dispersion of the catalyst is found to correlate directly with its activity maintenance when it is subjected to reforming conditions.

The surface of the catalyst over which the particles are dispersed necessarily includes the internal surface of the catalyst, i.e., the channels of the zeolite, but may also include dispersion over the external surface, which is considerably smaller. The dispersion will be present on those surfaces of the catalyst which are accessible to noble metal loading and dispersion techniques. The most preferred catalyst will contain highly dispersed noble metal atoms, all or substantially all of which are located inside the pores of the catalyst rather than on the exterior surface thereof. Thus, at least 75% and preferably, at least 90%, of the noble metal will exist inside the channels of the preferred catalyst herein. Further, the noble metal inside the channels must be well dispersed. The location of the particles can be inferred from electron spectroscopy for chemical analysis (ESCA) measurements which are well known to those skilled in the art.

ESCA measurements made to determine the possible preferential disposition of platinum on the external surface of the catalyst of the present invention showed no substantial platinum accumulation on the external zeolite surface of the freshly prepared catalyst or on the catalyst which has been treated by the multi-step technique as described hereinbelow. However, after the catalyst was deactivated, and after the decoking step which comprised an oxygen burn in the presence of water vapor, appreciable agglomeration of platinum near or at the external zeolite surfaces was detected. This is shown in the following table which gives the intensity ratio of the platinum 4f peak to the silicon 2p peak of the zeolite support in the ESCA analysis, which in turn is an indication of surface platinum-to-silicon ratio in the material being studied.

| ESCA Pt$_{4f}$/Si$_{2p}$ Intensity Ratio of Potassium-Exchanged Zeolite L Catalyst of this Invention | |
|---|---|
| Fresh Catalyst C of Example 1 (ion exchanged, 350° C. calcined) | 0.038 |
| Deactivated Catalyst C | 0.052 |
| Wet Oxygen Decoked Catalyst C | 0.12 |
| Catalyst of Enhanced Dispersion prepared by Multi-step Method from Deactivated Catalysts | 0.034 |

These data support the micrograph evidence, showing that in freshly prepared catalysts and catalysts which are treated by the multi-step method, the platinum was not preferentially concentrated near or at the external surfaces.

The property that the particles be well dispersed over the surface of the catalyst implies that there is no preferential disposition of noble metal particles on the external surface. In other words, it signifies that the noble metal is substantially uniformly distributed throughout the internal and external surfaces of the catalyst. This uniform distribution is approached to the extent that the ESCA measurements of the catalyst indicate substantially no preferential disposition of the noble metal on the external surface of the zeolite.

Additionally, the preferred catalyst produced by the process herein is characterized in that at least about 90% of the noble metal prior to reduction thereof is dispersed in the form of particles having a diameter less than about 7 Å. Thus, if, for example, more than 10% of the noble metal is dispersed in the form of particles measured to have diameters of 12–15 Å, or if more than 10% of the noble metal is dispersed in the form of particles measured to have diameters of greater than 15 Å, the catalyst exhibits reduced activity and activity maintenance. As measured by conventional bright field imaging in a transmission electron microscope with 4 Å point-to-point resolution, the particle size in the most preferred catalyst herein is found to be such that no greater than 2% of the noble metal is dispersed in the form of particles measured to be about 7 Å or greater in diameter.

The noble metal atoms may be clustered in any type of configuration, including that in which the atoms are connected to form a raft shape where they exist as a monatomic layer. The size of the particles as described above may be measured using high resolution electron microscopy. In this procedure, described in P. C. Flynn et al., *J. Catal.*, 33, 233–248 (1974), the noble metal loaded zeolite is prepared for the transmission electron microscope (TEM) by crushing in an agate mortar and pestle to produce zeolite fragments through which an electron beam can pass. The crushed powder is ultrasonically dispersed in ethanol and a drop of this suspension is allowed to dry onto a standard 3 mm TEM grid, which is covered with a thin ($\leq$200 Å) amorphous carbon film. Samples are analyzed in a Philips 400T TEM at 100 KV by conventional bright field imaging. Owing to the complexities of the contrast and imaging process involved in the bright field imaging mode, the lowest measurable noble metal particle diameter is 7 Å when the particle is in raft shape, and is 5 Å when the particle is in spheroidal (agglomerated) shape. The actual size may differ by ±2 Å from these measurements. Therefore, noble metal raft particles less than 7 Å in diameter in a catalyst of good dispersion cannot be detected by the bright field imaging method using the Philips 400T microscope. Thus, degree of dispersion is determined by measuring, the quantity of noble metal dispersed in measurable particles of diameter 7 Å or greater. The remainder of the noble metal necessarily exists in the form of particles below 7 Å in diameter.

When different samples are compared under the electron microscope, there is a ±50% uncertainty in the relative thickness of the specimen. Consequently, the estimated percentage amount of visible particulates (7 Å and greater if rafts, 5 Å and greater if spheroids) is subject to this same ±50% uncertainty. For example, a catalyst reported as comprising 10% noble metal particles measuring 7 Å in diameter or greater and 90% below 7 Å in diameter could actually consist of between 5% and 15% of visible particles measuring 7 Å or greater in diameter and between 95 and 85% of highly dispersed clusters below 7 Å in diameter.

Samples of fresh catalysts may also be examined using Z-contrast imaging. In this method samples are prepared exactly as for bright field imaging, but are examined using a high resolution scanning transmission electron microscope (STEM). In this instrument samples are examined by a finely focused electron beam about 5 Å in diameter, which is scanned across the sample. Signals collected by the various detectors positioned around the sample can be displayed on a synchronously scanned TV monitor to build up the image. Images formed by taking the ratio of the annular detector signal and the transmitted electron image-loss signal show contrast which is sensitive to variations of atomic number Z within the sample. Pt has an atomic number Z equal to 78 whereas zeolite L comprises only low Z atoms, K, Si, Al, O, H (Z=19, 14, 13, 8 and 1, respectively). Thus, Z-contrast imaging provides a sensitive method of detecting very small Pt clusters when supported on the zeolite L.

Figure 6:
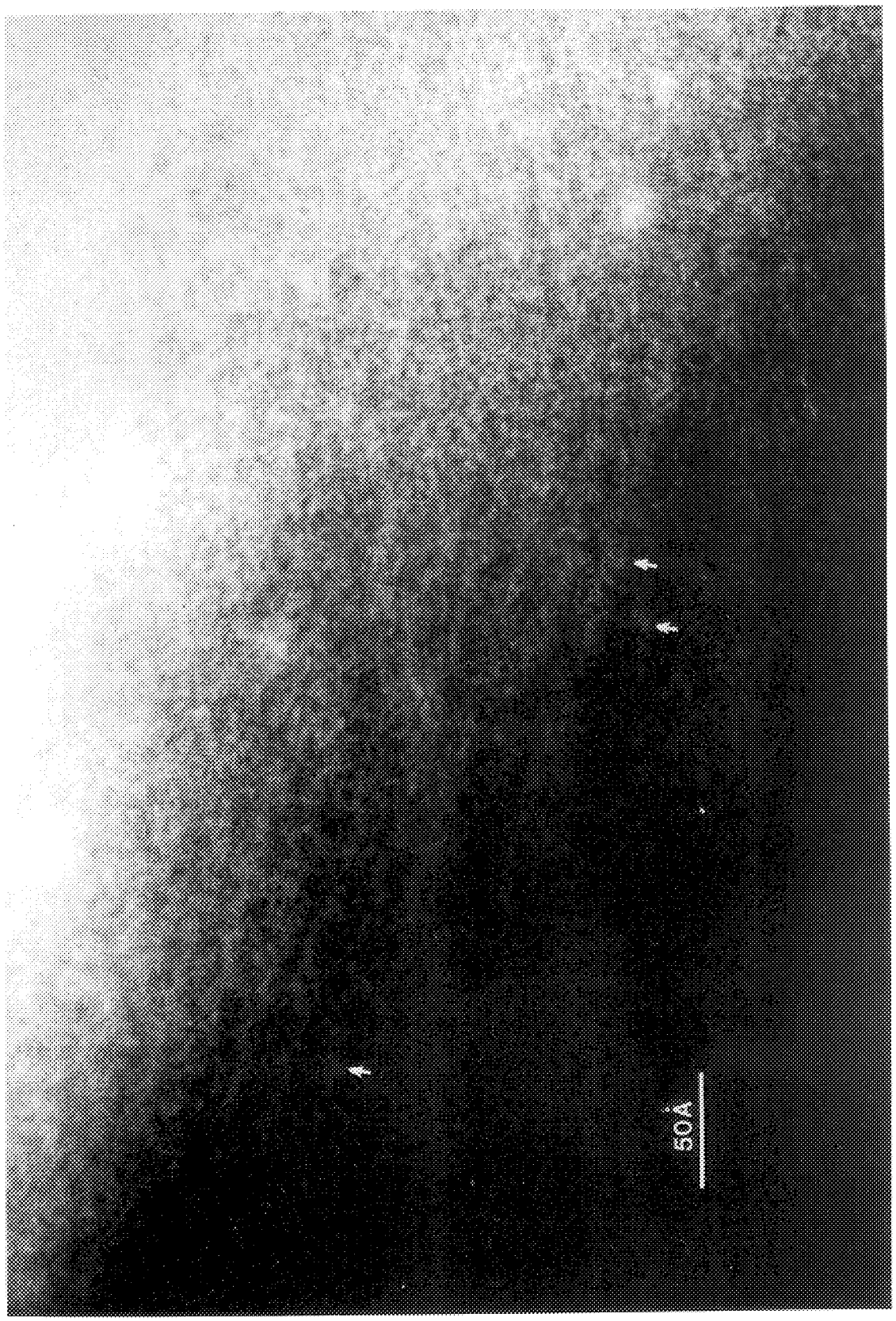
FIG. 6 represents an electron micrograph showing a Z-contrast image of a catalyst of this invention.

FIG. 6 is a Z- contrast image of a thin edge of catalytic material. On the micrograph, some of the visible small clusters of platinum, probably 3 atoms or less, are indicated by arrows. Other particles, some larger in size, are also visible. Also visible is the 16 Å spacing of the channels of the zeolite substrate. The metric scale on this diagram (horizontal line) corresponds to 50 Å. The Z-contrast image shows that the more highly active fresh catalyst, i.e. catalyst before exposure to hydrocarbon feed, contains many Pt clusters smaller than 5 Å, comprising 5 atoms or fewer. In contrast, a deactivated catalyst comprises mostly 12 to 15 Å Pt agglomerates and few clusters containing less than 5 atoms. Catalysts which are regenerated and dispersed also show a fine Pt dispersion with many clusters containing 5 atoms or fewer.

An additional method of probing the extent of dispersion and chemical state of the noble metal particles is EXAFS (Extended X-ray Absorption Fine Structure). EXAFS is an element-specific electron scattering technique in which a core electron ejected by an x-ray photon probes the local environment of the absorbing atom. The ejected photoelectron is back-scattered by the neighboring atoms of the absorbing species and interferes constructively or destructively with the outgoing electron wave, depending on the energy of the photoelectron. The energy of the photoelectron is equal to the difference between the x-ray photon energy and a threshold energy associated with ejection of the electron. In the EXAFS experiment the photoelectron energy is varied by varying the energy of the incident x-ray beam. The interference between outgoing and backscattered electron waves as a function of energy modulates the x-ray absorption coefficient so that the EXAFS function K·χ(k) is observed experimentally as oscillations in the absorption coefficient $\mu$ on the high energy side of the art the absorption edges.

Figure 7:
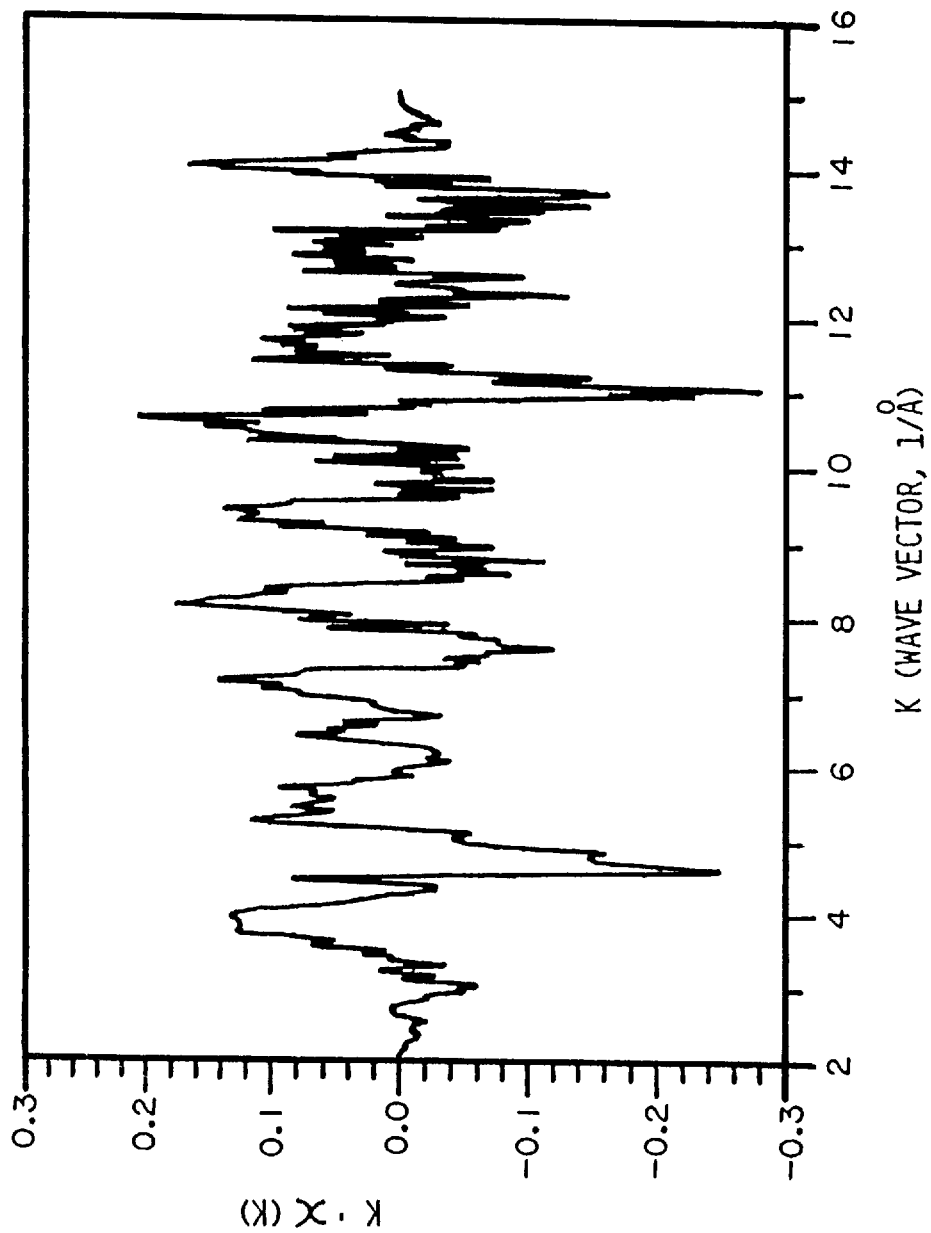
FIG. 7 represents an EXAFS pattern for a platinum on potassium-exchanged zeolite L catalyst.

For the EXAFS experiments, samples of various catalysts were dried, calcined and subsequently reduced in situ at between 400° and 500° C. The EXAFS measurements were made in flowing hydrogen at about −170° C. FIG. 7 shows the EXAFS pattern for a platinum on potassium-exchanged zeolite L catalyst similar to catalyst C of Example 1. The following table gives the nearest neighbor coordination number and interatomic distances calculated from the EXAFS data for various samples. Comparison of potassium-exchanged zeolite L with 1% Pt on $SiO_2$ (sintered to be representative of bulk platinum metal) shows that the Pt-Pt distance remains substantially unchanged from that in bulk metal whereas the Pt-Pt coordination is reduced from the bulk value of 12 nearest neighbors to approximately 5. This value of 5 is consistent with a catalyst in which the Pt is highly dispersed. For example, 1% $Pt/Al_2O_3$ described in Via et al., *J. Chem. Phys.*, 71, 690 (1979) has a coordination number of about 7 and gives a hydrogen to metal atom ratio of about 1 in a standard chemisorption test. These results indicate that essentially all of the metal atoms are surface atoms.

The EXAFS data for catalyst H of Example 1, which was deactivated on oil and regenerated via wet coke burn, oxychlorination, and wet post-treatment, is qualitatively the same as that obtained for the fresh reduced catalyst described above and is thus consistent with a high degree of metal dispersion.

| EXAFS Properties of Supported Pt Catalysts | | |
|---|---|---|
| Catalyst | $N_1$ | $R_1$ (Å) |
| 1% $Pt/SiO_2$, sintered | 12 | 2.775 |
| 0.6% Pt/potassium-exchanged zeolite L | 5 ± 1.5 | 2.766 |
| 1% $Pt/Al_2O_3$ | 7 ± 1.5 | 2.758 |

Note:
$N_1$ is equal to average nearest neighbor Pt—Pt coordination number.
$R_1$ is equal to average nearest neighbor Pt—Pt interatomic distance.

As an additional characteristic, if the catalyst is loaded with the noble metal by, for example, an ion-exchange technique, it is desirable that the type L zeolite chosen as the support have, prior to being loaded with the noble metal, a pH between 9 and 11.5 as determined by the following method: A 2.5 g sample of zeolite is equilibrated at ambient temperature with 70 cc of distilled water and the pH of the slurry is determined. The pH should be higher than about 9.3, preferably 10 to 11. If the pH of the zeolite is not within the above range, we believe that traditional impregnation or ion exchange methods will not yield a catalyst which has highly dispersed noble metal particles within a preferred size range. While not limited to any one theory, the belief is that the pH of the zeolite characterizes a surface state of the zeolite and controls the affinity of the zeolite for the noble metal during ion exchange or impregnation.

Another feature of the preferred catalyst produced herein which identifies those catalysts having the improved selectivity and activity maintenance as defined herein is its terminal cracking index (TCI). This index is defined as the molar ratio of pentanes to butanes produced when the catalyst is evaluated by the ECAT procedure described above using 100% n-hexane feed. The index measures the degree to which terminal cracking is promoted as opposed to internal cracking for a given catalyst. The higher this index the more selective the catalyst herein toward aromatization products because increased terminal cracking relative to internal carbon cracking of the hydrocarbon chain as measured by reforming n-hexane indicates that terminal adsorption of the substrate onto the noble metal occurs preferentially, as opposed to internal adsorption, thus favoring, for example, 1-6-closures for aromatization and terminal cracking of the hexane feed.

This index shows not only that to perform well the preferred catalyst herein must not be acidic, but also that the noble metal is not to any significant extent on the exterior surface of the catalyst, but rather is inside the channels of the catalyst and adsorbs the terminal carbon atom of straight-chain paraffins. For purposes herein, the terminal cracking index of the preferred type L zeolite catalyst produced by the process of this invention is greater than about 1.5, preferably greater than about 1.7.

FIG. 1 illustrates the relationship between the selectivity parameter (defined as the weight ratio of benzene product to the sum of total benzene plus $C_2$–$C_5$ produced) and the terminal cracking index (TCI) for zeolite L loaded with 0.6% Pt. The relationship shows a clear correlation, indicating that the terminal cracking index does accurately identify the selective reforming catalysts when a type L zeolite is employed as the catalyst base. FIG. 1 also illustrates that a conventional active 0.6% Pt on silica catalyst has a much lower terminal cracking index which does not exceed 1.0. Such a value is typical of random cracking of a hexane molecule.

The TCI of a given catalyst varies with the type of feed and the severity of the conversion. Generally, as the result of secondary cracking reactions, the TCI for catalysts which have a TCI above one under ECAT conditions described above will decrease as the conversion is increased, as indicated in the following Table I. These results show that ECAT is a better test for determining the TCI than the SAT test because the TCI is not meaningful at the high conversion levels encountered under SAT test conditions.

TABLE I 0.6 wt. % Pt on Zeolite L Catalyst
Loaded by Ion Exchange

| Temp. (°C.) | Pressure (KPa) | Space Velocity (w/w/hr.) | H$_2$/Hydrocarbon (mole:mole) | After 1-3 Hours on Oil | | TCI |
|---|---|---|---|---|---|---|
| | | | | Benzene Yield (wt. %) | Conversion (wt. %) | |
| 510 | 700 | 50 | 6.0 | 25.1 | 31.7 | 1.57[1] |
| 510 | 700 | 2.33 | 6.4 | 49.0 | 97.5 | 0.82[2] |

[1]This run was made using 100% n-hexane feed.
[2]This run was made using a feed of 60% n-hexane, 30% methylpentane and 10% methylcyclopentane. The latter two feed constituents are known to raise the TCI of the catalyst above what it would be using 100% n-hexane feed.

The TCI also varies with the type of catalyst employed, as indicated in Table II.

TABLE II

| Catalyst | wt. % Pt | Benzene Yield at 1-3 hrs. (wt. %) | TCI |
|---|---|---|---|
| Pt on NaX Zeolite | 1.0 | 30 | 0.9 |
| Pt on (Na/K) X Zeolites | 0.6 | 19.6 | 1.2–1.3 |
| Pt on K-treated SiO$_2$/Al$_2$O$_3$ | 0.73 | 4.1 | 0.8 |
| Pt on SiO$_2$ | 1.1 | 15.1 | 0.9 |
| Pt on SiO$_2$ | 0.74 | 10 | 0.9 |
| Pt on potassium-exchanged Zeolite L Catalyst of U.S. Pat. No. 4,104,320 | 0.6 | 21.1 | 1.3–1.4 |
| Pt on potassium-exchanged Catalyst preferred for this invention | 1.0 | 56.9 | 1.5–2.5 |

These results show that the catalyst of this invention which has a high TCI also has a high benzene yield. Experiments have shown, however, that the correlation between TCI and benzene yield cannot be made when the reforming catalyst is much less catalytically active than the catalysts listed in Table II above such as, e.g., platinum supported on KOH-treated (K-treated) silica/alumina.

Catalysts based on type L zeolites which have the preferred noble metal particle size and dispersion as described above will necessarily have the preferred terminal cracking index.

The preferred catalysts of this invention also exhibit substantial monofunctionality. Many known reforming catalysts exhibit bifunctionality in that not only do the noble metal atoms participate in the catalytic reaction, but also the acidic sites of the catalyst support. For example, a conventional catalyst consisting of Pt-Re metals on alumina aromatizes hexane through both the metal sites and the acid sites of the alumina support. In contrast, the catalyst herein behaves essentially monofunctionally in that the catalytic reactions predominantly occur on the noble metal sites of the catalyst, with only a small amount of catalysis occurring on the acidic sites initially produced when the catalyst is first reduced.

The catalysts herein may be prepared by any of the methods typically employed for preparing noble metal on zeolite catalysts. Noble metal loading, for example, may be carried out by impregnation or ion exchange as described, e.g., in U.S. Pat. No. 4,104,320.

The noble metal loaded zreolite catalyst thus prepared may be mixed with a binder material and formed into shapes before it is subjected to reforming conditions to improve the resistance of the catalyst to temperature, pressure and attrition. Platinum may be deposited on the zeolite powder before the addition of the binder and the pellet-forming steps or may be deposited on the formed tablets, pellets or extrudates. Any conventional binder which is substantially inert under the conditions in which the catalyst is to be employed may be utilized. Examples of suitable binders include kaolin, alumina and silica.

The regeneration process herein applies to deactivated catalysts at any stage of deactivation, including those which are severely deactivated. The severely deactivated Pt zeolite L catalysts, for example, have agglomerated Pt particle sizes comparable to the size of the main zeolite channel so that redispersion of the agglomerates is made particularly difficult. The process herein, however, is also applicable to moderately or mildly deactivated catalysts. Because the moderately deactivated Pt zeolite L catalyst has agglomerated Pt particle sizes smaller than the main zeolite channel, removal of Pt agglomerates to the external surfaces thereof is not essential for effective dispersion of the Pt particles. After deactivation the catalyst is subjected to the regeneration and enhanced dispersion method of this invention. In this general method, the coke is removed from the deactivated catalyst and the dispersion of the noble metal is enhanced by an oxychlorination procedure, for example, treating the catalyst with a source of chlorine and oxygen. The coke removal and oxychlorination steps may be carried out simultaneously or as separate steps. The excess chlorine is then removed from the catalyst and the noble metal therein is stabilized. This is preferably accomplished by treating the catalyst with a gas stream comprising a gas selected from oxygen, steam or mixtures thereof, for example, steam and air, under conditions such that the excess chlorine is removed. Preferably this step is accomplished using a treatment with wet oxygen. Also preferably water is present in the steps.

For use in reforming, the catalyst is reduced under a suitable atmosphere and conditions, preferably as described below.

In the more specific embodiment of this invention described below the gaseous stream used in each step has a remaining percentage (which is not water, hydrogen, oxygen or a source of chlorine) of an inert gas such as helium, argon or nitrogen which will not interfere with the process. Preferably water is present in the gaseous stream of each step.

In this more specific embodiment, the deactivated catalyst is contacted in a first step with a gaseous stream containing from 0 to 10% by volume water, preferably 0.5 to 5% by volume water, more preferably 1 to 3%, based on the total stream volume, and oxygen (usually in the form of an oxygen-containing gas such as air), hydrogen or an inert gas at a temperature of from about 380° to 540° C. For purposes herein the inert gas is defined as a gas which does not react with the catalyst and is a carrier for the other gases such as oxygen or hydrogen used in other steps. Examples of suitable inert gases include helium, argon and nitrogen or mixtures thereof. Preferably, if oxygen is employed, this first step is carried out at two temperatures, the first being at a lower temperature range of about 380° to 480° C., and the second being at a higher temperature range of about 480° to 520° C. The $O_2$ treatment at the lower temperature is preferably carried out for a longer time period than the second $O_2$ treatment. The exact time for heating will depend on the temperature employed, but generally ranges up to 10 hours, preferably 2 to 8 hours. The amount of oxygen employed is generally from 0.1 to 25% by volume, preferably 0.2 to 15% by volume, more preferably from 0.5 to 12% of the gas stream. If hydrogen is employed the amount is 1 to 25% by volume, preferably 2 to 20% by volume. If an inert gas is employed it may constitute up to 100% by volume of the gaseous stream.

The second step of this specific method can proceed in one of four manners:

(i) The catalyst is oxychlorinated (dispersion of the noble metal) by heating at a temperature of from about 400° to 530° C., preferably 480°–520° C., for up to 10 hours, preferably 1 to 3 hours, in the presence of a gaseous stream comprising from 0 to 10% by volume water, preferably 0.5 to 5%, more preferably 1 to 3%, a source of chlorine such as, e.g., $Cl_2$, HCl, chloroform, methyl chloride, carbon tetrachloride, 1,2-dichloroethane, trichloroethane or mixtures thereof, and the like, in an amount of about 0.005 to 10 volume percent, preferably 0.05 to 4%, more preferably 0.05 to 1%, and most preferably 0.05 to 0.5%, and in the presence of oxygen in an amount of 0.1 to 25% by volume, preferably 0.2 to 15%, more preferably 0.5 to 12%.

(ii) The catalyst is chlorinated by proceeding as in (i), except that hydrogen is used in place of oxygen. However, when HCl is the source of chlorine, hydrogen is not required. When proceeding in this manner, oxychlorination will occur in the third step discussed hereinbelow.

(iii) Steps (ii) and (i) can be combined, in that order the preferred chlorine sources in these steps are HCl and $Cl_2$.

(iv) The catalyst is chlorinated by heating at a temperature from about 400° to 530° C., preferably 480° to 520° C., for up to 10 hours preferably for 1 to 3 hours in the presence of a gaseous stream comprising from 0 to 10% by volume of water preferably 0.5 to 5% and more preferably 1 to 3% and 0.005 to 10% chlorine more preferably 0.05 to 1% and most preferably 0.05 to 0.5%.

If, however, hydrogen or an inert gas is employed in the first step, oxygen must be present in the gaseous stream of this second step, i.e., this second step must be an oxychlorination step, to ensure coke removal.

In the third step of this specific method (oxygen post-treat step), the catalyst is contacted with an oxygen-containing gaseous stream (where the amount of oxygen in the stream is generally 0.1 to 25% by volume, preferably 0.2 to 15%, more preferably 0.5 to 12% by volume) at a temperature of 400° to 540° C. for up to 7 hours if essentially no water is employed or for up to 5 hours in the presence of greater than 0 to 10 volume percent water. Preferably, this step is carried out from 480° to 520° C. in the presence of 0.5 to 5% by volume water for 0.5 to 3 hours and more preferably in the presence of 1 to 3 volume % water for 0.5 to 1.5 hours. If no water is present preferably the step is carried out for 0.5 to 6 hours, and more preferably for 1 to 5 hours.

In a fourth and final step (hydrogen reduction step) the catalyst is heated in the presence of a hydrogen-containing gaseous stream (where the amount of hydrogen in the stream is generally 1 to 25% by volume, preferably 2 to 20%) in the presence of from 0 to 10% by volume water at a temperature of from about 400° to 530° C. for up to 10 hours. Preferably this final step is carried out at a temperature of 400° to 520° C. in the presence of 0.5 to 5% by volume water for 1 to 6 hours.

In all steps, reactor pressure is generally from 0.1 to 2 MPa. Preferably the gas flow rates for each step in the above process range from about 1 to 300 cc/g of catalyst per minute. If no oxychlorination step is employed, preferably the gas flow rate of the oxygen post-treat step is below 20 cc/g catalyst/min. and preferably below 10 cc/g catalyst/min. Optionally the second step can consist of a chlorination step followed by an oxychlorination step as described hereinabove.

The catalysts of enhanced dispersion produced by the process of this invention may be employed as reforming catalysts using reforming conditions which are well known in the art.

To minimize any hydrocracking reactions which tend to prevail at the beginning of the reaction, it may be desirable to introduce a small amount (less than 0.1% by weight) of sulfur to the catalyst.

The following discussion is particularly directed to the preferred catalysts produced by the process herein which have the special properties defined above. Without being limited to any one theory, it is believed that the selectivity and maintenance of the catalyst are greatly influenced by the manner in which the reactant molecules are adsorbed at the active site of the catalyst. This theory is hereinafter called "molecular die" catalysis.

If the hexane is adsorbed terminally (through the $C_1$ atom), subsequent reaction preferably leads to aromatization. Another reaction occurring to a lesser extent is terminal cranking of adsorbed hexane. If initial adsorption is through a nonterminal carbon atom, no such aromatization can occur because end carbon activation is required for 1–6 ring closure. While terminal cracking also leads to methane production, the aromatization reaction occurs to a greater extent. The adsorption pattern may be influenced by the three-dimensional structure of the catalyst, which may columnate the reactant molecules. Furthermore, the interior structures of and spacial factors within the catalyst may affect favorably postadsorption reactions as by, e.g., stabilizing or destabilizing the transition states so as to favor cyclization of adsorbed molecular species.

The channel structure of the zeolites gives rise to these molecular die effects, i.e, the zeolite one-dimensional channel structure orients the hexane molecules parallel to the axis of the channels. This orientation facilitates terminal adsorption onto the noble metal particles, leading to the observed increased activity and selectivity for aromatization.

The catalysts of enhanced dispersion produced by the process herein need not be used only in conventional reforming of naphthas derived from petroleum or other sources of hydrocarbons and boiling in the range of about 71° to 216° C., but may also be employed to produce the corresponding aromatic products from any reactant organic compound containing at least six carbon atoms, including those which contain reactant functional groups. Examples of reactant compounds suitable for this purpose include paraffins such as n-hexane, n-heptane, n-octane, n-nonane, etc., preferably naphtha boiling in the fraction between 71° and 216° C. Preferred reactions herein are aromatization of n-hexane to benzene, n-heptane to toluene, and n-octane to ethylbenzene and/or xylenes. n-Hexane may be present in the feed or produced by isomerization of methylpentanes and methylcyclopentane. Since the catalyst is monofunctional and does not promote isomerization without cyclization, feed compounds such as dimethylbutanes are not effective.

Additional reactions where the reforming catalyst produced by the process herein, especially the preferred class of catalysts produced herein, may be employed advantageously include benzene production from streams such as light naphtha, i.e., a naphtha boiling between about 30° and 100° C., high octane gasoline production from naphtha or light virgin naphtha where the endpoint is between $C_7$ and $C_{12}$, inclusive.

The reforming processes described above are carried out under general reforming conditions in the presence of hydrogen at a moderate pressure to favor the aromatization reaction thermodynamically. For traditional reforming of paraffins to aromatics, the temperature depends on the particular paraffin, but for acceptable rate and selectivity preferably ranges from about 400° to 550° C., more preferably from about 450° to 520° C. at pressures of about 200 KPa to 5 MPa, more preferably about 500 KPa to 4 MPa. If the temperature is much below about 400° C. the yield of product is quite low, and if the temperature substantially exceeds about 550° C., other reactions occur which also diminish the yield of product. The liquid hourly space velocity of this reforming reaction is preferably from about 0.5 to 20 w/w/hour, more preferably from 1 to 10 w/w/hour, and the $H_2$/reactant mole ratio is preferably from about 2 to 20, more preferably from about 4 to 10.

The dehydrocyclization reaction is generally carried out by injecting a feedstock charge in the presence of hydrogen gas into a reactor containing the catalyst.

The examples which follow illustrate the efficacy of the invention. In all examples, parts and percentages are given by weight for solids and liquids and by volume for gas compositions, and temperatures in degrees Centigrade unless otherwise noted.

EXAMPLE 1

Regeneration of Deactivated Catalyst a. Preparation of Catalyst:

A zeolite L having a composition expressed in moles of pure oxide of: $0.99\ K_2O:Al_2O_3:6.3SiO_2:XH_2O$ and having a cylindrical shape and an average particle size of about 2 to 2.5 micron was prepared by the technique described in Example 1 of U.K. Patent Application 82-14147 filed May 14, 1982 to Wortel, entitled "Improved Zeolite L." Thus, an alkaline synthesis gel was prepared by dissolving 23.40 g of aluminum hydroxide by boiling in an aqueous solution of 51.23 g of potassium hydroxide pellets (86% pure KOH) in 100.2 g of water to form Solution A. After dissolution any water loss was corrected. A separate solution, solution B, was prepared by diluting 225 g of colloidal silica (Ludox HS 40) with 195.0 g of water.

Solutions A and B were mixed for two minutes to form a gel, and just before the gel became fully stiff, 224 g thereof was. transferred to a Teflon-lined autoclave, preheated to 150° C. and held at that temperature for 72 hours to bring about crystallization.

b. Platinum Ion-Exchange of Catalyst

Figure 2:
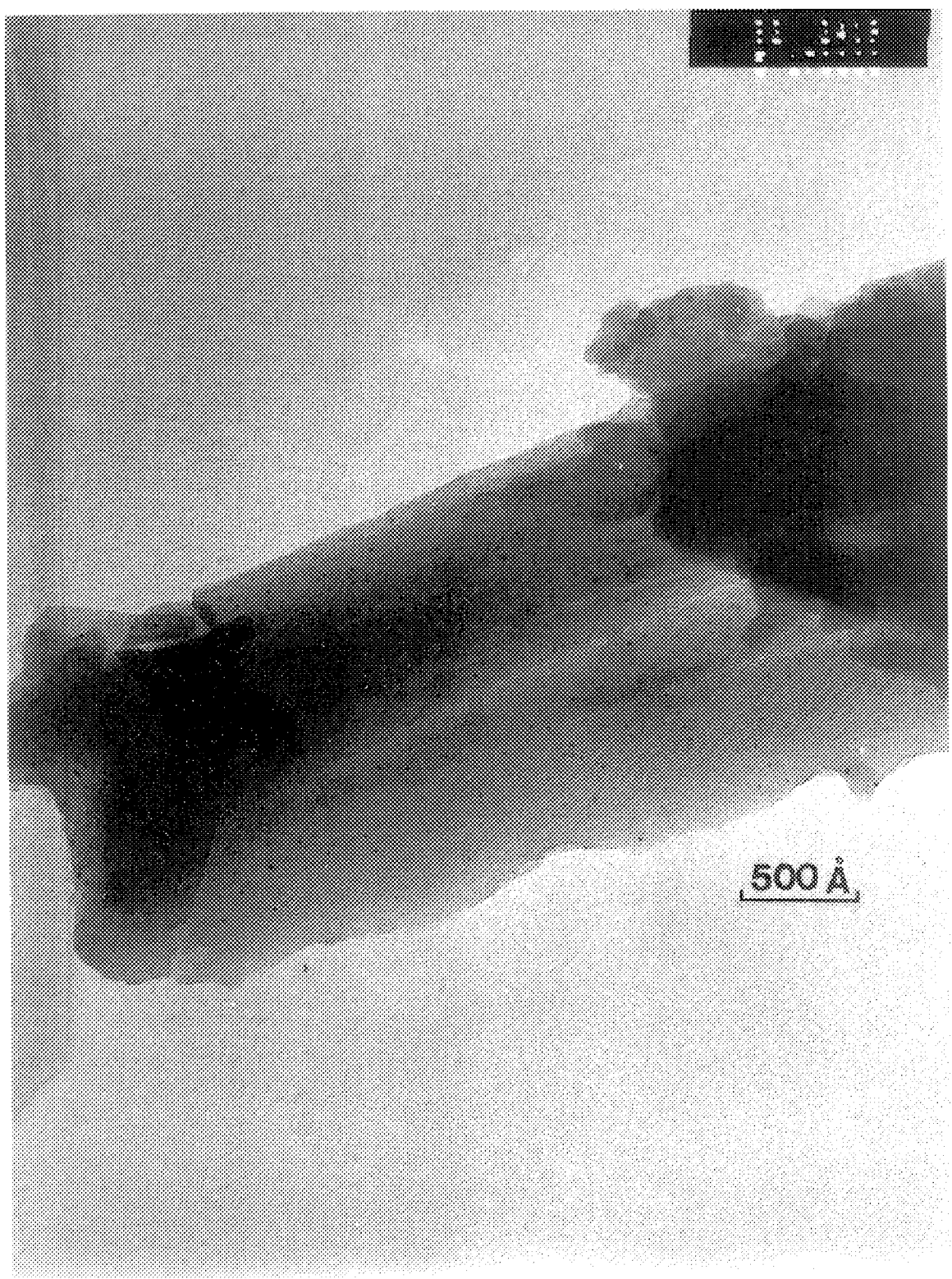
FIG. 2 represents an electron micrograph of a deactivated catalyst which was treated at 510° C. and 700 kPa (gauge) for 350 hours at a space velocity of 2.5 w/w/hour and a $H_2$:hydrocarbon molar ratio of 6, wherein the hydrocarbon feed was 60% n-hexane, 30% isohexane and 10% methylcyclopentane, where the metric scale is indicated on the micrograph.

The separated zeolite was slurried in water and $Pt(NH_3)_4Cl_2$ solution was added over about a two-hour period. Following the addition of the Pt source stirring was continued overnight. The mixture was then filtered and the loaded potassium exchanged zeolite L, containing 0.6% Pt by weight, was dried, tableted, crushed, screened to 20/40 mesh, and calcined.

c. Deactivation of Catalyst:

This catalyst was then deactivated in a reactor during a light naphtha aromatization run using a feed of 60% n-hexane, 30% isohexane and 10% methylcyclopentane, run at 510° C. and 700 kPa (gauge) at a space velocity of 2.5 w/w/hour and at a hydrogen to hydrocarbon ratio of 6, for about 350 hours. At the end of the run the deactivated catalyst, called catalyst A, contained 2.18% coke by weight and Pt agglomerates of about 12 Å diameter. FIG. 2, representing an electron micrograph of catalyst A, shows that 90% of the Pt was dispersed in the form of particles measured to have a diameter of about 12 Å and 10% having a diameter less than about 7 Å.

d. Regeneration of Deactivated Catalyst:

A total of 6.2 g of catalyst A was charged in a reactor and contacted with a series of gas compositions as described below flowing at a rate of 200 cc/min. for the given period of time. The remaining percentage of the gas compositions consisted of He gas.

| Step | Temp. (°C.) | Gas Composition(%) | Duration (hrs.) | Electron Microscopy Measurements After Step |
|---|---|---|---|---|
| Wet Coke Burn | 480 | 2% $O_2$, 2% $H_2O$ | 2.5 | — |
| Wet Coke Burn | 510 | 9% $O_2$, 2% $H_2O$ | 1.5 | >90% of Pt 50–150Å |
| Wet Oxychlorination | 510 | 9.7% $O_2$, 0.2% HCl, 2% $H_2O$ | 2.5 | >90% of Pt < 7Å |
| Wet $O_2$ Post-Treat | 510 | 9.3% $O_2$, 2% $H_2O$ | 1.0 | >99% of Pt < 7Å |
| Wet $H_2$ Reduction | 510 | 20% $H_2$, 2% $H_2O$ | 1.4 | >99% of Pt < 7Å |

The resulting regenerated catalyst B was evaluated and compared with catalyst A for production of benzene using the ECAT procedure described above using a feed of 80% n-hexane and 20% methylcyclopentane. The results are indicated below:

| | Benzene Yield (wt. %) Time on Oil (hrs.) | | |
|---|---|---|---|
| Catalyst | 2 | 24 | 48 |
| Catalyst A | 0.5 | — | — |
| Catalyst B | 14.4 | 12.3 | 12.0 |

The terminal cracking index of catalyst B was found to range from 1.77 to 2.37 when the feed was 80% n-hexane and 20% methylcyclopentane.

Figure 3:
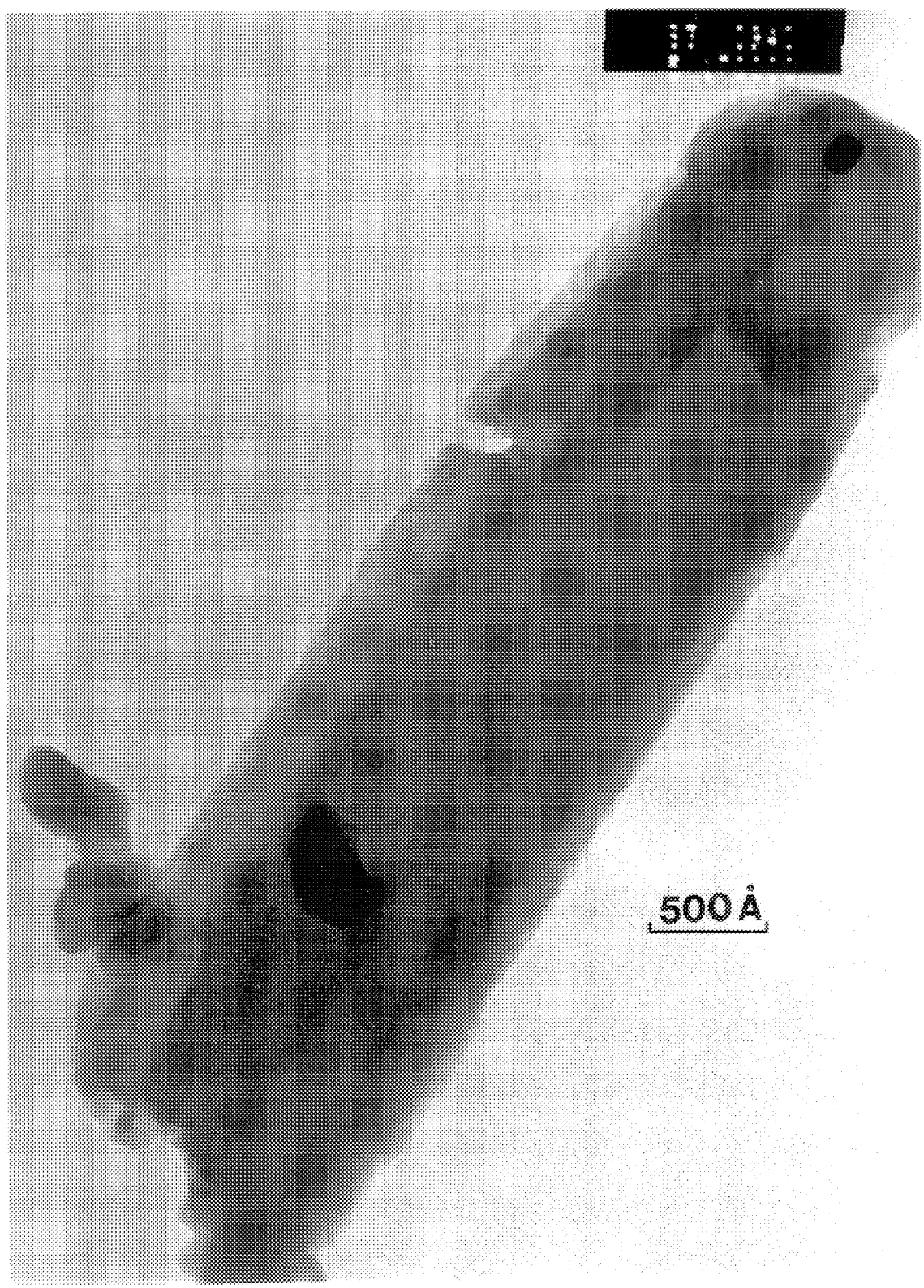
FIG. 3 represents an electron micrograph of the catalyst of FIG. 2 after regeneration and dispersion by the process of this invention, where the metric scale is indicated on the micrograph.

FIG. 3, representing the electron micrograph of this regenerated catalyst B, indicates that greater than 99% of the Pt was dispersed in the form of particles having a diameter less than 7 Å and less than 1% measured to have a diameter of 7 Å or greater.

A micrograph of Catalyst B before the wet $H_2$ reduction step indicated that greater than 99% of the Pt was dispersed in the form of particles having a diameter of less than 7 Å and less than 1% of the Pt measured to be 7 Å or greater. Thus, the reduction step did not adversely affect the dispersion properties of the catalyst treated by the multi-step regeneration technique herein.

Interposing a step of cooling to room temperature in the presence of oxygen or inert gas such as nitrogen for 1 day between the wet oxychlorination and the wet $O_2$ post treat steps had little effect on dispersion and activity as compared to the above results.

Figure 4:
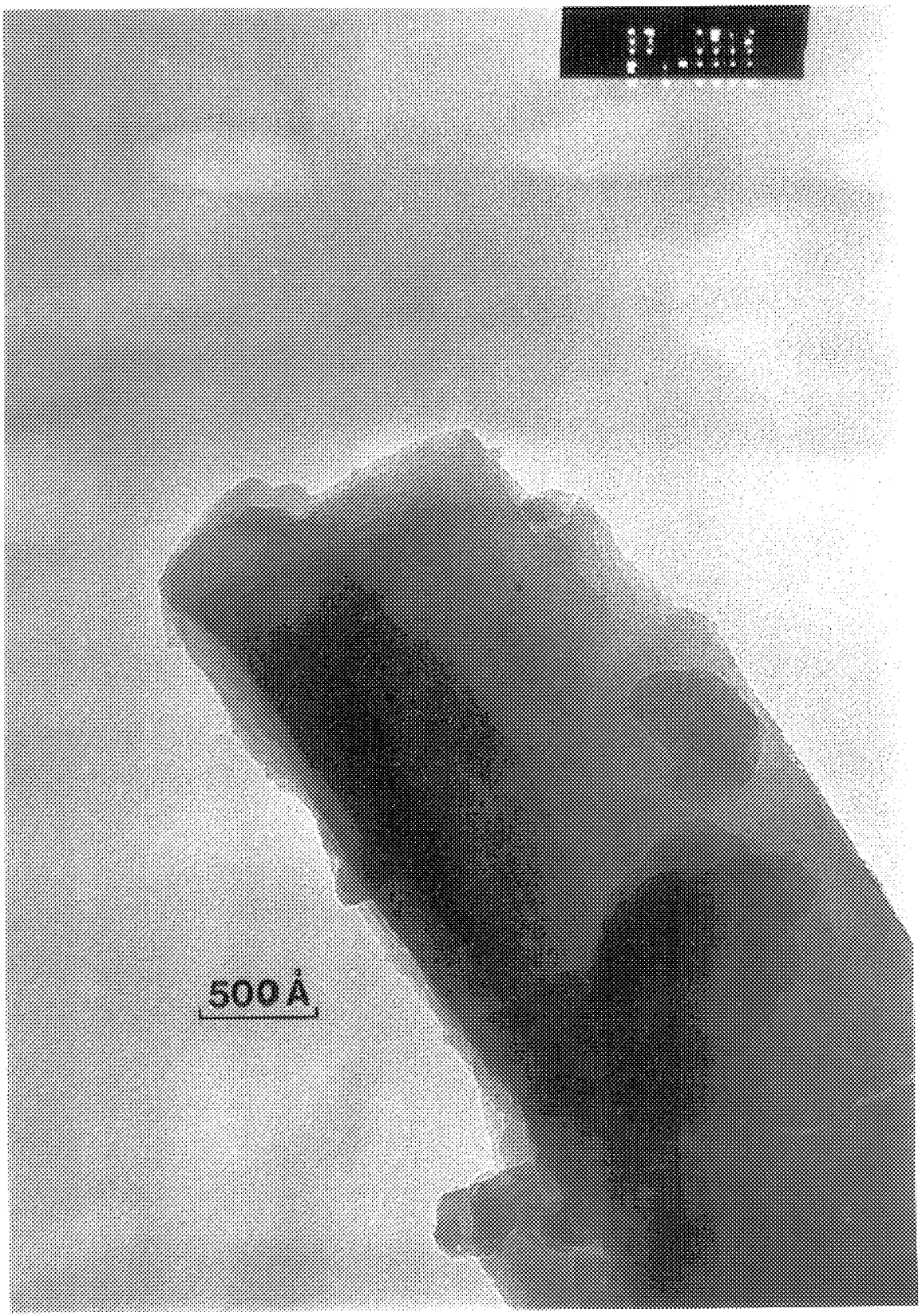
FIG. 4 represents an electron micrograph of a comparative catalyst regenerated and dispersed without an oxygen posttreat step, where the metric scale is indicated on the micrograph.

Following the regeneration procedure described above only through the wet oxychlorination step provided a catalyst when tested under ECAT conditions with 20% methylcyclopentane and 80% n-hexane feed, yielded only 1.0 wt. % benzene after 2 hrs. on oil. When this catalyst was reduced in hydrogen at 510° C. for one hour, platinum agglomeration is observed. As shown in FIG. 4, about 40% of the platinum measures about 10 Å in diameter with the remainder being dispersed as particles with diameter less than 7 Å.

When the wet $O_2$ post-treat of the regeneration and enhanced dispersion procedure was practiced at 200° C. or lower instead of at about 510° C., at 2 hrs. on oil the benzene yield was only 2.4 wt. % in ECAT. The above procedure is substantially the same as that described in French Patent Publication 2,360,540.

When the wet $O_2$ post-treat step was extended from 1 to 7 hrs., ECAT yield was 1.3 wt. % benzene at 2 hrs. on oil.

This example illustrates the criticality of the wet $O_2$ post-treat step.

EXAMPLE 2

A total of 8.5 g of catalyst A of Example 1 was regenerated to give catalyst C as described in Example 1 using the conditions and steps given below:

| Step | Temp. (°C.) | Gas Composition (%) | Duration (hrs.) |
| --- | --- | --- | --- |
| Dry Coke Burn | 380 | 2.1% $O_2$ | 2.5 |
| Dry Coke Burn | 510 | 10% $O_2$ | 1.5 |
| Dry Oxychlorination | 510 | 9.4% $O_2$ 0.3% HCl | 2.5 |
| Dry $O_2$ Post-Treat | 510 | 9.8% $O_2$ | 1 |
| Dry $H_2$ Reduction | 510 | 20% $H_2$ | 1 |

Figure 5:
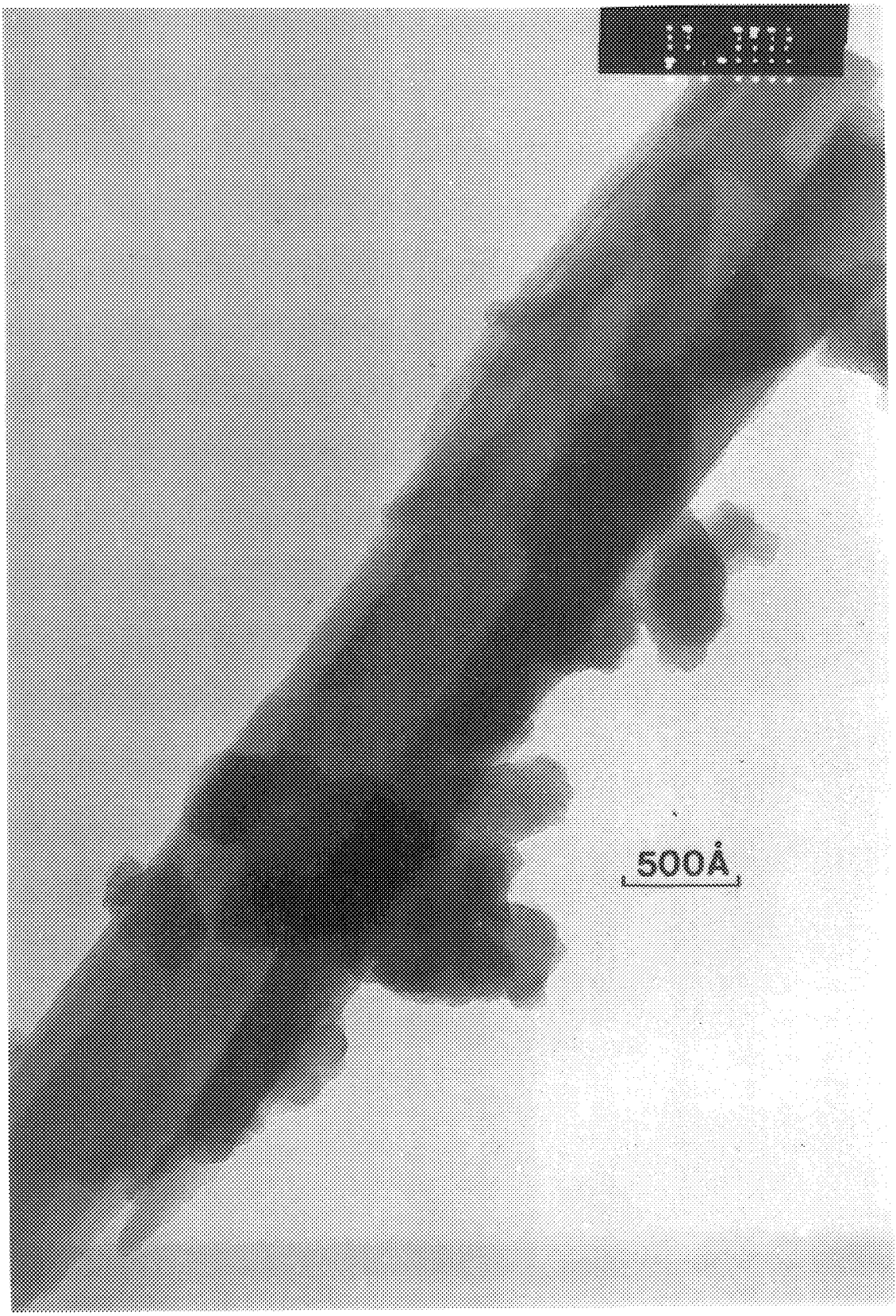
FIG. 5 represents an electron micrograph of a catalyst regenerated and dispersed using a dry process, where the metric scale is indicated on the micrograph.

FIG. 5 shows that catalyst C is not as well dispersed as catalyst B in that 20% of the Pt was dispersed in the form of particles measured as averaging about 8 Å, and only 80% of the platinum was dispersed in particles below 7 Å. The activity and activity maintenance of catalyst C were satisfactory, but were less than that of catalyst B, as shown by the ECAT results below obtained using the procedure and feed of Example 1.

| | Benzene Yield (wt. %) Time on Oil (hours) | |
| --- | --- | --- |
| Catalyst | 2 hours | 24 hours |
| Catalyst C | 7.7 | 8.9 |
| Catalyst B | 14.4 | 12.3 |

EXAMPLE 3

A total of 4.2 g of catalyst A of Example 1 was regenerated and dispersed to give catalyst D as described in Example 1 except that the flow rate in the wet $O_2$ post-treat was 50 cc/min., using the conditions and steps given below:

| Step | Temp. (°C.) | Gas Composition (%) | Duration (hrs.) |
| --- | --- | --- | --- |
| Wet Coke Burn | 380 | 2.2% $O_2$, 2% $H_2O$ | 2.5 |
| Wet Coke Burn | 510 | 9.3% $O_2$, 2% $H_2O$ | 1.5 |
| Wet HCl Treat | 510 | 0.2% HCl, 2% $H_2O$ | 1.25 |
| Wet $O_2$ Post-Treat | 510 | 10% $O_2$ | 1 |
| Wet $H_2$ Reduction | 510 | 20% $H_2$ | 1 |

The ECAT results using 100% n-hexane show that HCl may be employed alone without simultaneous introduction of oxygen gas:

| | Benzene Yield (wt. %) Hours on oil | | TCI Hours on oil | |
| --- | --- | --- | --- | --- |
| | 2 hrs. | 22–24 hrs. | 2 hrs. | 22–24 hrs. |
| Catalyst D | 16.4 | 20.1 | 1.52 | 1.64 |

The electron micrograph indicated that greater than 99% of the Pt was dispersed in the form of particles having a diameter less than 7 Å. This example shows that oxychlorination can take place during the oxygen post-treatment if the catalyst is chlorinated in the absence of oxygen.

EXAMPLE 4

A total of 4.2 g of catalyst A of Example 1 was regenerated and dispersed to give catalyst E as described in Example 1 using the conditions and steps given below:

| Step | Temp. (°C.) | Gas Composition (%) | Duration (hrs.) |
| --- | --- | --- | --- |
| Wet Coke Burn | 380 | 2% $O_2$, 2% $H_2O$ | 2.5 |
| Wet Coke Burn | 510 | 9.3% $O_2$, 2% $H_2O$ | 1.5 |
| Wet Oxychlorination | 510 | 9.6% $O_2$, 0.15% $Cl_2O$ | 2.5 |
| Wet $O_2$ Post-Treat | 510 | 9.7% $O_2$, 2% $H_2O$ | 1 |
| Wet $H_2$ Reduction | 510 | 20% $H_2$, 2% $H_2O$ | 1 |

The ECAT results using a 100% n-hexane feed showed that catalyst E exhibited good initial activity and activity maintenance in the production of benzene.

| | Benzene Yield (wt. %) Hours on oil | |
| --- | --- | --- |
| | 2 hrs. | 22–24 hrs. |
| Catalyst E | 36.0 | 18.0 |

EXAMPLE 5

A total of 4.9 g of catalyst A of Example 1 was regenerated and dispersed to give catalyst F as described in Example 1 using the conditions and steps given below:

| Step | Temp. (°C.) | Gas Composition (%) | Duration (hrs.) |
|---|---|---|---|
| Wet Coke Burn | 380 | 2.3% $O_2$, 2% $H_2O$ | 2.5 |
| Wet Coke Burn | 510 | 10.1% $O_2$, 2% $H_2O$ | 1.5 |
| Wet Oxychlorination | 510 | 10% $O_2$, 0.2% HCl, 2% $H_2O$ | 2.5 |
| Dry Helium Treat | 510 | 100% He | 1 |
| Dry $O_2$ Post-Treat | 510 | 10% $O_2$ | 1 |
| Dry $H_2$ Reduction | 510 | 20% $H_2$ | 1 |

The ECAT results using 20% methylcyclopentane and 80% n-hexane show that the dry helium, oxygen and hydrogen steps decreased the performance of the catalyst as compared to wet post-treat steps, as shown below. The initial activity of catalyst F, however, was satisfactory.

| | Benzene Yield (wt. %) Time on Oil (hrs.) | |
|---|---|---|
| Catalyst | 2 hrs. | 22–24 hrs. |
| Catalyst F | 11.6 | 6.1 |
| Catalyst B | 14.4 | 12.3 |

EXAMPLE 6

A total of 9.3 g of catalyst A of Example 1 was regenerated and dispersed to give catalyst G, using the procedure described in Example 1 except that the flow rates, conditions and steps given below were used:

| Step | Temp. (°C.) | Gas Composition (%) | Flow Rate (cc/min.) | Duration (hrs.) |
|---|---|---|---|---|
| Dry $H_2$ Treat | 510 | 20% $H_2$ | 840 | 1.5 |
| Dry HCl Treat | 510 | 0.21% HCl | 300 | 2.5 |
| Dry Oxychlorination | 510 | 1.8% $O_2$, 0.21% HCl | 330 | 2.25 |
| Dry Oxychlorination | 510 | 7.2% $O_2$, 0.21% HCl | 300 | 6.8 |
| Dry $H_2$ Reduction | 510 | 20% $H_2$ | 500 | 1.5 |

This example indicates that the coke burn step can be omitted when oxygen is present during chlorination.

The ECAT results using a feed of 20% methylcyclopentane and 80% n-hexane show that catalyst G had poor initial activity and activity maintenance. Thus, an oxygen post-treat step is required.

| | Benzene Yield (wt. %) Time on Oil (hrs.) | |
|---|---|---|
| Catalyst | 2 hrs. | 22–24 hrs. |
| Catalyst G | 7.4 | 4.1 |
| Catalyst B | 14.4 | 12.3 |

In summary, the present invention is seen to provide a method of regenerating moderately or severely deactivated reforming catalysts, preferably potassium-exchanged zeolite L containing platinum thereby substantially restoring catalyst activity and activity maintenance to the catalyst.

What is claimed is:

1. A process for treating a deactivated monofunctional, non-acidic reforming catalyst at a stage where coke has been removed, said deactivated reforming catalyst comprising zeolite L and a catalyst metal comprising at least one Group VIII noble metal, wherein said process comprises:

a) exposing said deactivated zeolite L catalyst to a gaseous stream comprising less than about 10 vol. % water, inert gas, and about 1 vol. % to about 25 vol. % hydrogen, at a temperature within the range of about 380° C. to about 540° C. for up to about 10 hours to effect a reduction of said catalyst;

b) subjecting said catalyst to a gaseous stream comprising inert gas, 0.1 vol. % to 25 vol. % oxygen, less than about 10 vol. % water, and about 0.005 vol. % to about 10 vol. % of a source of chlorine under conditions comprising a temperature within the range of about 400° C. to about 530° C. effective for dispersing the at least one Group VIII noble metal on the surface of the zeolite L catalyst;

c) exposing said catalyst to another gas stream comprising inert gas, about 0.1 vol. % to about 25 vol. % oxygen, less than 10 vol. % water and under conditions comprising a temperature within the range of about 400° C. to about 540° C. effective for removing excess chlorine from said catalyst, stabilizing the Group VIII noble metal, and resulting in said Group VIII noble metal being well dispersed as particles over said surface of said catalyst upon subsequent reduction; and d) contacting the catalyst from which excess chlorine has been removed with another gaseous stream comprising less than about 10 vol. % water, inert gas, and about 1 vol. % to about 25 vol. % hydrogen, at a temperature within the range of about 400° C. to about 530° C. for up to about 10 hours to effect a reduction of said Group VIII noble metal particles of the catalyst.

2. The process of claim 1, wherein at least about 90% of said particles have a diameter of less than about 7 Angstrom as measured with bright field imaging on a transmission electron microscope with 4 Angstrom point-to-point resolution.

3. The process of claim 1, wherein said source of chlorine in said gas stream in step b) is within the range of about 0.05 vol. % to about 4 vol. %.

4. The process of claim 1, wherein the source of chlorine in said gaseous stream in step b) is a member selected from the group consisting of $Cl_2$, HCl, chlorinated hydrocarbons and mixtures thereof.

5. The process of claim 4, wherein said source of chlorine in said gaseous stream in step b) is a member selected from the group consisting of HCl and $Cl_2$.

6. The process of claim 1, wherein said temperature in step b) is within the range of about 480° C. to about 520° C.

7. The process of claim 1, wherein said gas in step c) comprises at least one member selected from the group consisting of oxygen and mixtures of oxygen and steam.

8. The process of claim 1, wherein said gas in step c) comprises a mixture of oxygen and steam.

9. The process of claim 1, wherein said amount of oxygen in said gas in step c) is within the range of about 0.5 vol. % to about 12 vol. %.

10. The process of claim 1, wherein said amount of water in said gas in steps) is within the range of about 1.0 vol. % to 3.0 vol. %.

11. The process of claim 1, wherein said gas in step c) is essentially devoid of water.

12. The process of claim 1, wherein said step c) is continued for a time less than about 7 hours.

13. The process of claim 1, wherein said another gaseous stream in step d) contains essentially no water.

14. The process of claim 1, wherein said another gaseous stream in step d) comprises about 0.5 vol. % to about 5 vol. % water.

15. The process of claim 1, wherein said inert gas is nitrogen.

16. The process of claim 1, wherein said inorganic binder material is selected from the group consisting of kaolin, alumina and silica.

17. The process of claim 1, wherein said L zeolite comprises exchangeable cations at least a portion of which are selected from the group of exchangeable cations consisting of lithium, sodium, potassium, rubidium, cesium, calcium, and barium, and mixtures of lithium, sodium, potassium, rubidium, cesium, calcium, and barium.

18. The process of claim 8, wherein said exchangeable cations are selected from the group consisting of potassium, and barium.

19. The process of claim 1, wherein said Group VIII noble metal is platinum.

20. The process of claim 19, wherein said catalyst metal comprises rhenium.

21. The process of claim 1, wherein the amount of said Group VIII noble metal present is within the range of about 0.2 wt. % to about 6 wt. %.

* * * * *